United States Patent
Prader

(10) Patent No.: US 9,833,732 B2
(45) Date of Patent: Dec. 5, 2017

(54) FILTER FOR CONTINUOUS FILTRATION OF A SUSPENSION UNDER PRESSURE

(71) Applicant: Andritz AG, Graz (AT)

(72) Inventor: Rainer Prader, Stattegg (AT)

(73) Assignee: Andritz AG, Graz (AT)

( * ) Notice: Subject to any disclaimer, the term of this patent is extended or adjusted under 35 U.S.C. 154(b) by 260 days.

(21) Appl. No.: 14/509,472

(22) Filed: Oct. 8, 2014

(65) Prior Publication Data

US 2015/0101974 A1    Apr. 16, 2015

(30) Foreign Application Priority Data

Oct. 11, 2013   (AT) ...................................... 784/2013

(51) Int. Cl.
| | | |
|---|---|---|
| *B01D 33/21* | (2006.01) | |
| *B01D 36/00* | (2006.01) | |
| *B01D 33/46* | (2006.01) | |
| *B01D 33/48* | (2006.01) | |

(52) U.S. Cl.
CPC ........... *B01D 36/001* (2013.01); *B01D 33/21* (2013.01); *B01D 33/466* (2013.01); *B01D 33/48* (2013.01)

(58) Field of Classification Search
CPC combination set(s) only.
See application file for complete search history.

(56) References Cited

U.S. PATENT DOCUMENTS

| | | | |
|---|---|---|---|
| 3,471,026 A | | 10/1969 | Riker |
| 3,485,378 A | * | 12/1969 | Regel ..................... B01D 33/11 210/393 |
| 4,207,190 A | * | 6/1980 | Sheaffer ................. B01D 33/21 210/232 |
| 5,053,123 A | * | 10/1991 | Clarke-Pounder ..... B01D 33/21 210/138 |
| 5,503,737 A | * | 4/1996 | Luthi ..................... B01D 33/82 210/138 |
| 5,540,846 A | * | 7/1996 | Koch ..................... B01D 33/21 134/31 |

(Continued)

FOREIGN PATENT DOCUMENTS

| | | |
|---|---|---|
| DE | 36 14 668 A1 | 12/1986 |
| EP | 0400787 | 12/1990 |
| EP | 0 596 857 A1 | 10/1993 |

*Primary Examiner* — Bobby Ramdhanie
*Assistant Examiner* — Michael An
(74) *Attorney, Agent, or Firm* — Alix, Yale & Ristas, LLP

(57) ABSTRACT

The invention relates to a filter for continuous filtration of a suspension under pressure, with a pressure vessel (1), rotating filter elements (2) disposed in the pressure vessel (1), where the filter element (2) passes through one filter cycle for each rotation, with filter zones in liquid and gaseous phase, also with filtrate channels (4') that are connected between the filter elements (2) and separate filtrate outlets (14, 14', 215) for each filter zone, as well as a device to control the individual filtrate zones by means of a control disc (44), where the control disc (44) has filtrate outlets (114, 115) for liquid and gaseous phase. It is primarily characterized in that a venting zone (46) is provided before the filtrate outlet of the liquid phase, viewed in the direction of the filter cycle. Thus, the compressed air in the filter elements (2) and filtrate channels (4') can be carried off and pressure-relieved in a favorable manner.

9 Claims, 4 Drawing Sheets

(56) References Cited

U.S. PATENT DOCUMENTS 5,620,598 A * 4/1997 Strid ................. B01D 33/21
 210/324
5,707,512 A * 1/1998 Koch ................. B01D 33/21
 210/136
5,958,231 A * 9/1999 Sacherer ............. B01D 33/11
 210/247

* cited by examiner

FILTER FOR CONTINUOUS FILTRATION OF A SUSPENSION UNDER PRESSURE

BACKGROUND

The invention relates to a filter for continuous filtration of a suspension under pressure, with a pressure vessel, rotating filter elements disposed in the pressure vessel, where a filter element passes through one filter cycle for each rotation, with filter zones in liquid and gaseous phase, also with filtrate channels that are connected between the filter elements and separate filtrate outlets for each filter zone, as well as a device to control the individual filtrate zones by means of a control disc, where the control disc has filtrate outlets for liquid and gaseous phase.

Filters of the kind mentioned above are used as pressure filters to dewater fibrous suspensions, among other materials, but also more and more to dewater suspensions containing mineral solids, such as coal or ores, in order to achieve a higher degree of dewatering, i.e., a higher dryness. One example of a pressure filter for fibrous suspensions is described in DE 36 14 668 A1. Here, a pressure disc filter is shown, however it would also be possible in principle to use a pressure drum filter. A filtration cycle usually consists of a so-called cake formation, i.e. formation of a filter cake, or a filter mat in the case of fibrous suspensions, on the filter element. The following refers generally to filter cakes, however it also relates in the same way to a filter mat made of fibrous pulps. This cake formation can also take place in several stages, as is described in DE 36 14 668 A1. Another variant of a pressure filter is described in EP 0 596 857 A1. When the filter cake has formed, air is blown through it. In vacuum filters, the liquid contained in the filter cake is removed by suction, and in pressure filters it is pressed through it as a result of the higher pressure. Then filter cake washing may be included as the next stage in the filtration cycle, and the washing liquid here can then also be removed again from the filter cake by the pressure differential prevailing on the filter element (vacuum or internal vessel pressure). After this, the filter cake is removed from the filter element, which can be achieved by means of water or air jets (fibrous mat), a compressed air snap blow, or doctors. Then a new filtration cycle begins. At the beginning of the filtration cycle, it is important to guarantee that the filter cell and the filtrate pipe, to which several filter cells may also be mounted, are vented. In pressure filtration, the filter cell(s) and filtrate pipe volume are also under the working pressure in the vessel. As a result, venting takes place abruptly at the beginning of the cake formation zone due to the drop in pressure to the atmospheric pressure prevailing outside the vessel and results in considerable pressure shocks, swirling and turbulence in the cake formation zone. When this happens, the expanding volume of air is usually much larger than the filtrate quantity to be removed in the cake formation zone.

SUMMARY

The aim of the invention is, therefore, to provide a device that prevents this disadvantage.

A feature of the invention is that a venting zone opening is provided in the control disc before the cake formation zone opening, viewed in the direction of the filter cycle. Due to the system air being discharged separately before actual cake formation, the cake formation zone can be calmed, which leads to much more even cake formation because the pressure shocks are avoided.

The disclosed filter comprises a pressure vessel, at least one filter element rotatable on a filter shaft in a filter cycle direction through a liquid suspension region and a gas region within the pressure vessel, where each filter element passes through one filter cycle for each rotation, first forming an accumulation of solids on the filter element when immersed in the suspension region and with filtrate drawn into the filter element, followed in the gas region where filtrate and gas pass through the accumulated solids and enter the filter element. Separate filtrate channels are provided in the shaft, where filtrate is collected from within the filter element and delivered to one end of the shaft. A control head at the end of the shaft includes a control disc with a cake formation zone operatively associated with some filtrate channels and the immersion region during the rotation and a dewatering zone operatively associated with other filtrate channels and the gas region during the rotation. Separate filtrate outlets are provided for each zone. The control disc includes a distinct venting zone provided before a given filtrate channel reaches the cake formation zone, viewed in the direction of the filter cycle.

An advantageous development is characterized in that the separate filtrate outlets are connected to separation tanks arranged at a lower level, where the separation tanks can be connected to the filtrate outlets via so-called barometric drop legs with a vertical length of 6 to 10 m. As a result of the barometric drop leg, also known as barometric or geodesic leg, additional suction pressure is generated in the cake formation zone, which leads subsequently to better dewatering and/or increased throughput.

A favorable embodiment is characterized in that the venting zone is connected to the separation tank via a separate pipe. This guarantees that the expanding compressed air is removed from the system separately and subsequently, the drop legs almost exclusively contain a liquid column as a result of which the barometric suction pressure is guaranteed. If there is too much air in the drop legs, this liquid column would collapse and no suction pressure would be able to form.

BRIEF DESCRIPTION OF THE DRAWING

The invention will now be exemplified on the basis of the drawing, where.

DETAILED DESCRIPTION

Figure 1:
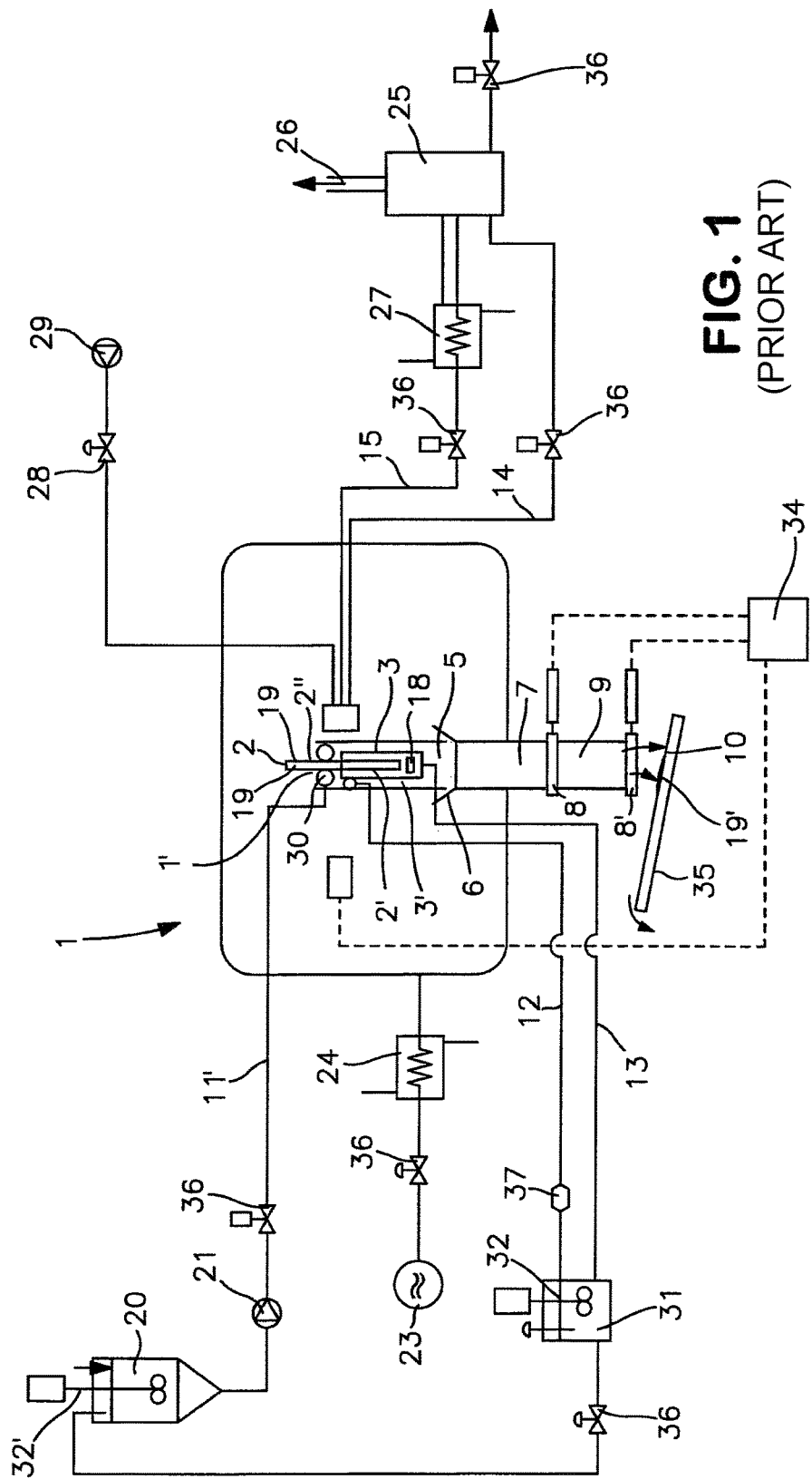
FIG. 1 shows a state-of-the-art pressure filtration plant.

FIG. 1 shows a pressure filter based on a disc filter as an example, with a state-of-the-art filter disc. Of course, the invention can also be applied to disc filters with several filter discs or to drum filters, where the filter cells are disposed around the circumference of a drum. In this pressure filtration system, a mineral suspension, for example, from ore or coal beneficiation is drawn by suction from a storage tank 20 with an agitator 32' by pump 21 with the appropriate system pressure and pumped from above through a filtrate feed device 30 into the filter trough 3. The filter trough 3 is installed inside a pressure vessel 1. The filter trough 3 is operated with permanent overflow 12 and drainage 13 in order to avoid solids concentrations. The flow through the filter trough 3 with pulp and homogenization of the pulp is enhanced by an agitator 18. The flow rate to the pulp feed pump 21 is set automatically by the electric motor, controlled by a frequency converter according to the pulp overflow quantity. The pulp overflow quantity is measured by a flow measuring station 37. The overflow 12 and the drainage flow 13 run over a gravimetric gradient into a suspension collecting tank 31 with agitator 32 designed as a pressurized agitator vessel. Pulp from the pressure vessel 31 can be conveyed back into the storage tank by a level-controlled pump (not shown) with submerged suction pipe or only by means of pressure gradient. Compressed air from a compressed air station, e.g. an air compressor 23, is fed to the filter 2 as working medium. The air can be heated to the necessary temperature by means of a heater 24 before entering the pressure chamber. The filter 2 is a hollow filter disc rotating on the shaft and with separate abutting sectors, where the inside of the sectors is provided with a separate means of filtrate drainage into channels in the shaft in each case. The shaft is designed in the usual way as a center core on one side of the filter disc, where filtrate drainage pipes are provided inside the shaft and discharge into openings arranged in a face end cover disc on the shaft, which are disposed equidistant to one another round the circumference. The face end cover disc forms the rotating part of the control head. As an alternative, the filtrate drainage could also be designed as filtrate pipes disposed on the outside of the shaft circumference and which discharge into the openings arranged in the face end cover disc of the center core.

However, when the filter disc 2 is in operation, the solid/liquid mix in the liquid suspension region 3' defined by the filter trough 3 is filtered in the immersion zone 2' of the filter disc 2 such that liquid is pressed through the filter layer into the inside of the sectors concerned, while solids collect in a layer 19 (filter cake) on the surface of the filter. In the gas region 1' in pressure vessel 1 outside the immersion zone of the filter disc 2, pressurized gas is pressed through the solids layer that has built up and causes the remaining liquid in the solids and the gas to pass into the inside of the sectors concerned, thereby forming a dewatered zone 2" of the filter element.

As a result, the filtration process produces practically pure liquid on the one hand—the cake formation filtrate—and gas/liquid mixture on the other hand—the dewatering filtrate, whose liquid content will generally be all the lower the longer the time period since the sector concerned has emerged from the filter trough 3.

As a rule, cake formation filtrate and dewatering filtrate are drained off separately from one another. For this purpose, the control head has a fixed counter-disc to the center core's face end cover disc, over which the face end cover disc slides flush on the counter-disc and which is provided with slots around the circumference combining the openings in the face end cover disc that conduct the cake formation filtrate on the one hand with the openings in the face end cover disc that conduct the dewatering filtrate on the other hand in such a way that the two filtrates can largely be conducted through separate drainage pipes.

The cake formation filtrate 14 containing the lowest possible proportion of air flows into a filtrate separator 25 into which the dewatering filtrate 15 is also fed after cooling in the air/gas cooler 27 in which condensate is formed. The exhaust air flows out at the top 26 of the filtrate separator 25. The filtrate/condensate mix removed can be disposed of in an appropriate way. Here, the dewatered solids (e.g. ore or coal concentrate) are discharged through a lock 7, 8, 8', 9. The filer cake removed from the filter disc 2, e.g. by means of a snap-blow valve 28 and compressed air from the snap-blow compressor 29, drops through discharge shafts 5 mounted on both sides of the filter disc 2 into a discharge funnel 6. Snap-blow detaching of the filter cake is a known process in which the filter material is inflated by a jolting blast of compressed air against the filtration direction, which causes the dewatered filter cake to flake off. As an alternative, the filter cake can also be scraped off the filter cloth by doctors and fed into the discharge funnel 6. From the discharge funnel 6 the filter cake enters the lock storage tank 7. A lock gate 8, 8' is then opened and closed alternately, whereby the filter cake first enters the lock chamber 9 and then reaches the filter cake discharge 10. The lock gates 8, 8' are operated by a hydraulic unit 34. The discharged filter cake 19' is taken away on a belt conveyor 35, for example. The quantities of air, steam, suspension feed, suspension overflow, suspension removal by suction, and also the filtrate quantity can be controlled by means of regulating valves 36 or the respective pipes can also be shut off entirely.

Figure 2:
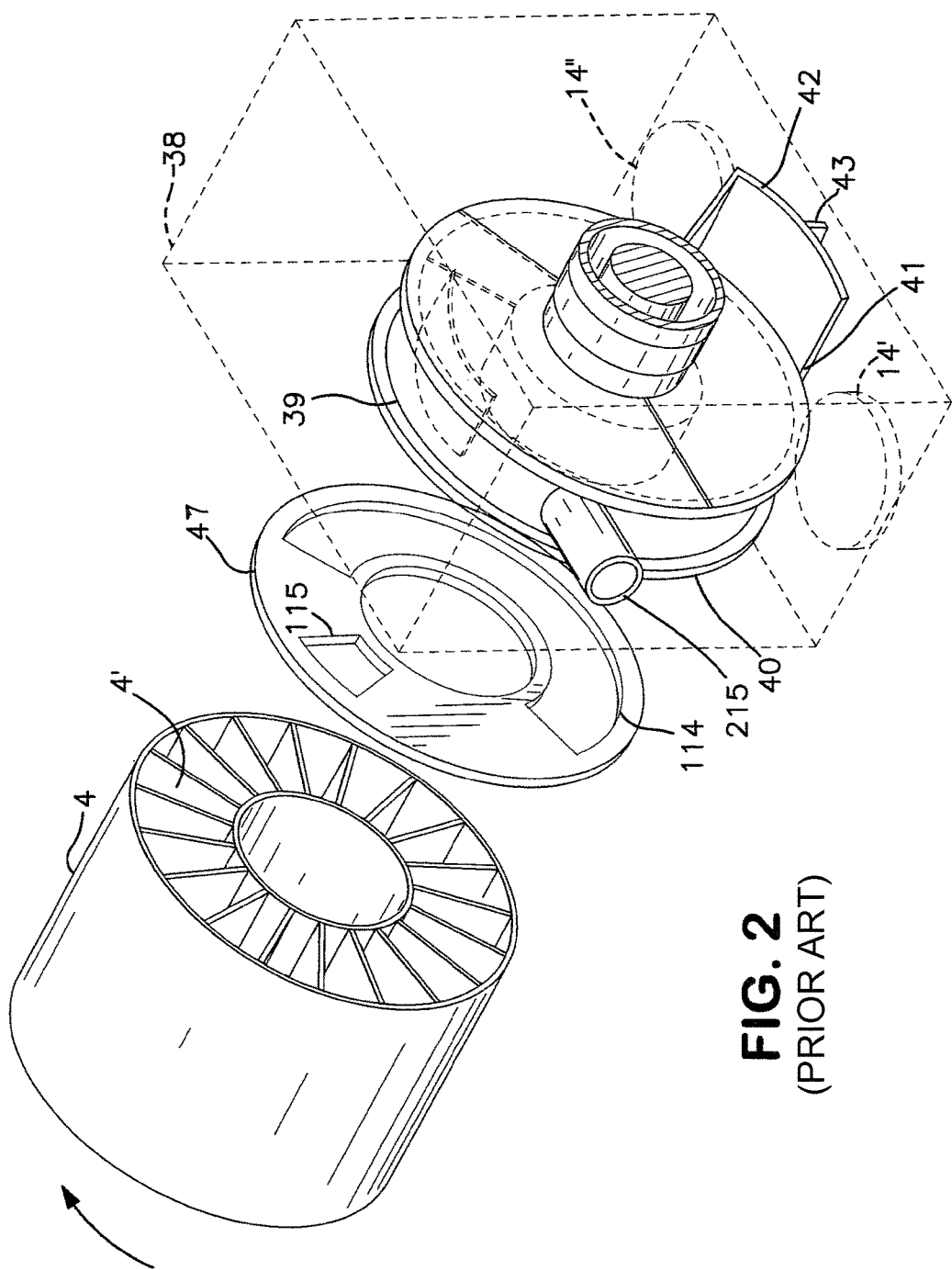
FIG. 2 shows the design of a state-of-the-art control head.

FIG. 2 provides a schematic view of the control head design with control disc and filter shaft. The control head is generally referenced with the FIG. 38. The dewatering filtrate is drained off through an outlet pipe 215, while the cake formation filtrate is divided into a cloudy filtrate 14" and a clear filtrate 14'. The outlet pipes 14', 14" are designed as barometric drop legs and are connected subsequently to a filtrate separator (not shown). The control head 38 comprises a hollow cylindrical part 39 with a flange 40 at the inlet side and a flange 41 on the outlet side. The desired distribution of cloudy filtrate at 14" and clear filtrate at 14' is achieved here, particularly by means of a splitter 42 with a sealing strip 43. In FIG. 2, the filter shaft 4 rotates in the clockwise direction indicated by the arrow, and is fitted with individual filtrate drainage channels 4'. A shaft with a smaller diameter and filtrate pipes on the outside can also be used as an alternative. The liquid from the individual filter segments is collected in the filtrate drainage channels 4' and brought to the end of the filter, where it is fed to the control head 38. Here, the filtrate runs through a stationary control disc 47 that regulates the chronological sequence of cake formation and dewatering, as well as cake discharge. The filtrate zones 114, 115 on the control disc correspond respectively to the filter zones of the filter elements and the liquid and gas regions of the tank. The cake formation filtrate zone 114 is very long compared to the dewatering filtrate zone 115 because the dry content in the solids is only of minor importance compared to recovery of the (clear) filtrate.

Figure 3:
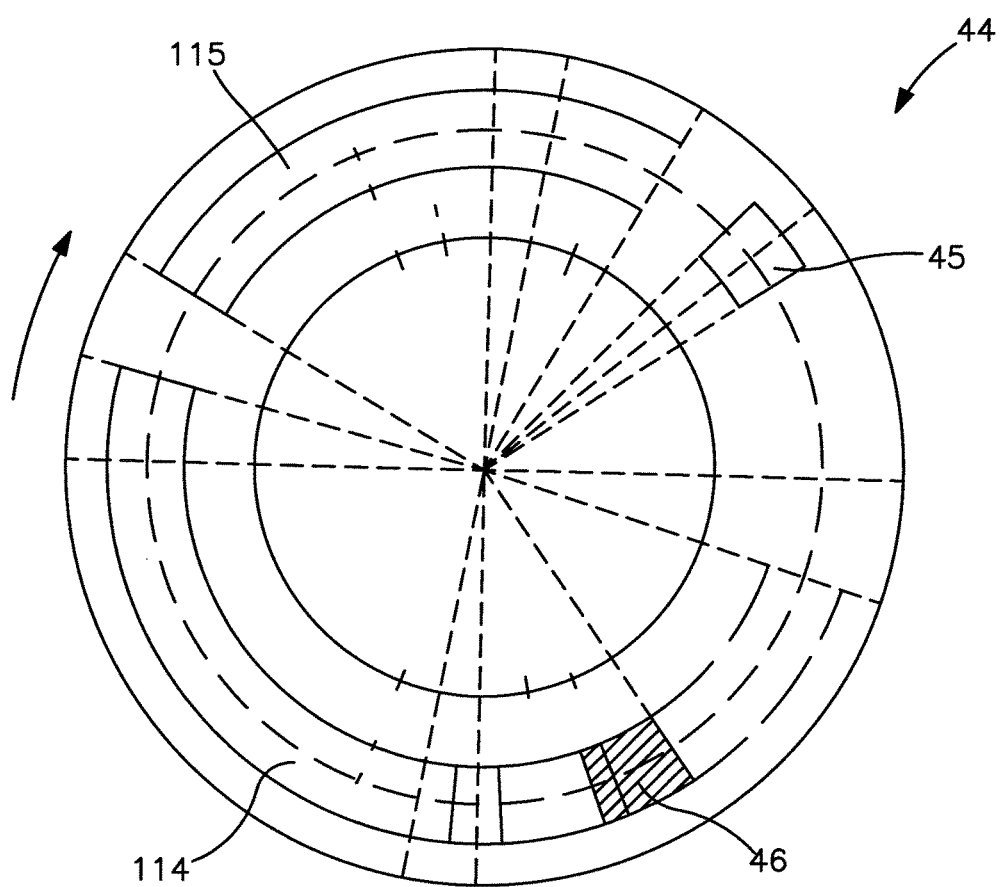
FIG. 3 shows a control head according to the invention.

FIG. 3 now shows an improved control disc 44 relative to the control disc in FIG. 2. The control disc has a dewatering zone 115 as well as a cake formation zone 114. While the cake formation zone 114 is largely below the liquid level of the suspension to be dewatered during operation, the dewatering zone 115 is above this level. The result is that there is very little air in the cake formation filtrate, but the dewatering filtrate contains primarily air. After the filter cake has been dried by suction through the dewatering zone 115, there is compressed air snap-blow through the opening 45 in the control disc 44. A venting zone 46 is disposed in front of the cake formation zone 114 in the direction of the filter cycle (indicated by the shaft rotation direction arrow). This is used to relieve the pressure in the compressed air in the filter segment and the related filtrate pipe (filtrate channel) 4' to atmospheric pressure without coming into contact with the cake formation zone 114. Since there is only air here, wear on the leading edge of the cake formation zone 114 can thus be prevented, which substantially increases the service life of the control disc 44 and the control head. In this manner, a specific filtrate channel 4' first passes the cake formation zone 114, then the dewatering zone 115 (with gas drawn through), followed by the snap blow zone 45 and just before starting the cycle again, passes the new venting zone 46.

Figure 4:
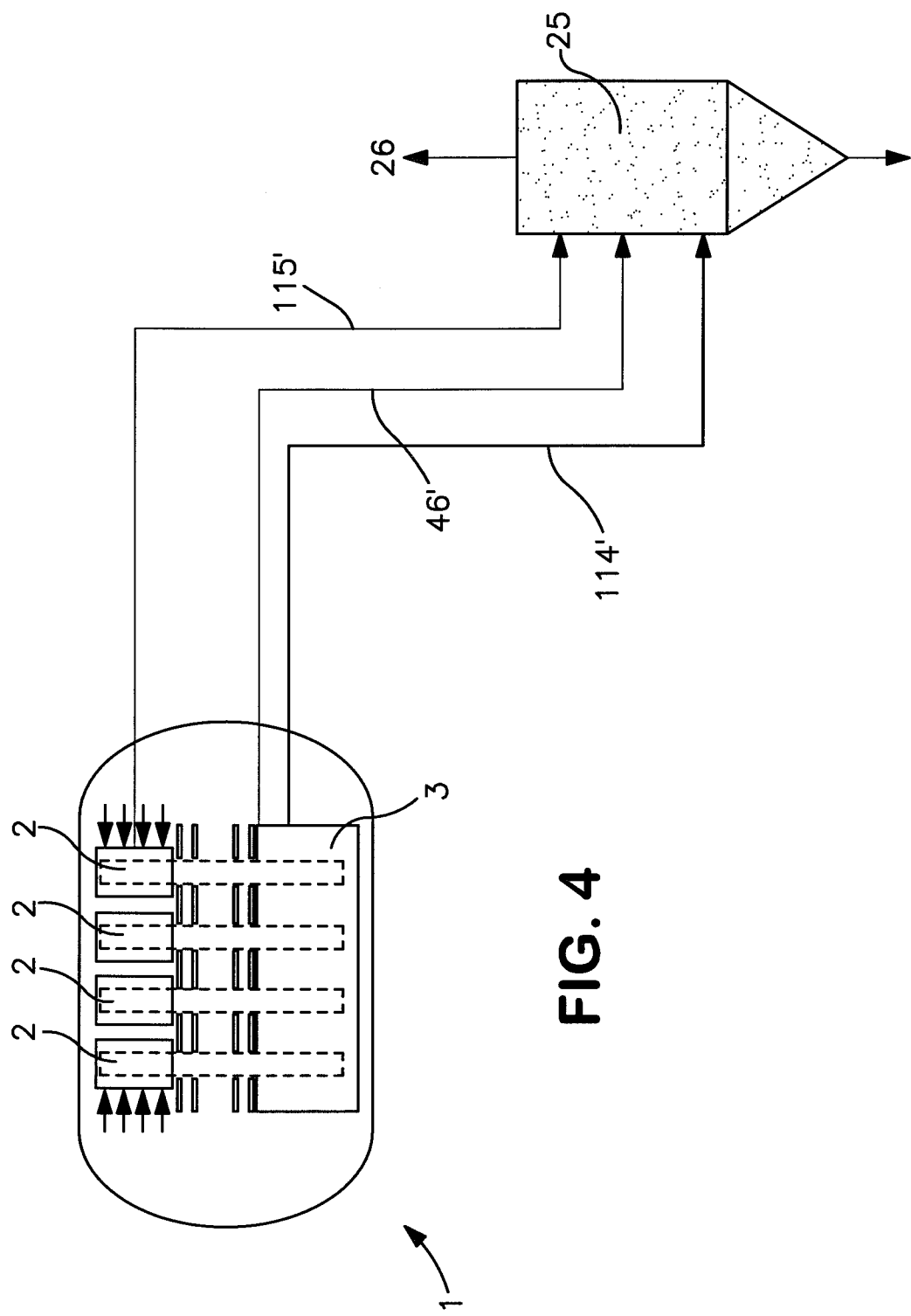
FIG. 4 shows a schematic view of an arrangement according to the invention.

FIG. 4 shows a schematic arrangement of a pressure filter with pressure vessel 1 and examples of filter discs 2 that immerse into a filter trough 3. Of course, it is also possible in principle to use a drum filter. The cake formation zone is fluidly connected to a filtrate separator 25 by a drop leg pipe 114', where the filtrate separator 25 is disposed on a much lower elevation than the pressure vessel 1 with filter trough 3, which creates a so-called barometric drop leg. Depending on the arrangement and design of the filter, the difference in height (and thus the vertical length of the barometric drop leg) can be between 6 and 10 m. The dewatering zone 115 is also fluidly connected to the filtrate separator 25 by a pipe 115'. The venting zone 46 according to the invention is also fluidly connected to the filtrate separator by a pipe 46', which is also separate. In this way, all of the air escaping at the top end of the filtrate separator 25 can be conveyed through a pipe 26 into the open air, for example. As the (compressed) air, which is now pressure-relieved, from the filter elements and filtrate pipes is now removed separately, a continuous flow of filtrate can also be maintained in the cake filtrate outlet 14' and thus also an additional vacuum. As a result, the effective differential pressure in the cake formation zone 114 increases compared to the state of the art so far and an increase of approximately 5 to 15% can be achieved in the throughput. In addition, the angle for the dewatering zone 115 can also be enlarged, which results in an increase in dry content of approximately 1-2% in addition.

Due in particular to the knowledge that turbulence can occur in the cake formation zone and that a continuous flow of filtrate could not be achieved in the drop legs due to the air left in the filter elements and filtrate pipes as a result of the pressure being relieved and to the now separate removal of this pressure-relieved air in a separate venting zone, the barometric height and also a turbulence-free suspension could be utilized for the first time to achieve better dewatering of mineral solid/liquid suspensions in particular.

The invention is not restricted to the examples shown, but can also be used in drum filters in particular, as well as in other continuous pressure filters.

The invention claimed is:

1. In a filter for continuous filtration of a suspension in a pressure vessel pressurized over atmospheric pressure (1), including rotating filter elements (2) disposed in the pressure vessel (1), and subject to said overpressure, where a filter element (2) passes through one filter cycle for each rotation, with filter zones (2', 2") in liquid and gaseous phase,
also with filtrate channels (4') that are fluidly connected between the filter elements (2) and separate filtrate outlets (14, 215) for each filter zone,
as well as a control head to control the individual filter zones by a control disc, where the control disc has a cake formation zone (114) and a dewatering zone (115) operatively associated respectively with the liquid and gaseous phases, whereby for each rotating filter element, filtrate is discharged through the filtrate outlet for the cake formation zone and thereafter filtrate and air are discharged through the filtrate outlet for the dewatering zone, such that during rotation of each filter element a portion of the filter element containing primarily air is operatively disconnected from the dewatering zone and the cake formation zone;
wherein the control disc further includes a snap blow zone (45) and said snap blow zone (45) is between the dewatering zone (115) and the cake formation zone (114), viewing in the direction of the filter cycle;
the improvement comprising that a venting zone (46) is provided in the control disc (44) after the snap blow zone (45) and before the cake formation zone (114), viewed in the direction of the filter cycle, and the venting zone (46) is connected to said portion of the filter element and to a separation tank (25) via a separate pipe (46') to release the primarily air in said portion of the filter element (2) and connected filtrate channel (4') to atmospheric pressure.

2. Filter according to claim 1, wherein the separate filtrate outlets (14, 215) are connected to said separation tank (25) arranged at a lower elevation than the pressure vessel (1).

3. Filter according to claim 2, wherein the separation tank is connected to the filtrate outlets via barometric drop legs (114', 115') with a vertical length of 6 to 10 m.

4. Filter according to claim 2, wherein
one outlet (215) is fluidly connected to the dewatering zone (115) of the control disc for collecting dewatering filtrate;
a second outlet (14") is fluidly connected to the cake formation zone (114) of the control disc for collecting cloudy cake filtrate;
a third outlet (14') is fluidly connected to the cake formation zone (114) of the control disc for collecting clear cake filtrate;
barometric drop legs (114', 115') fluidly connect the filtrate outlets (14', 14", 215) to said separation tank (25).

5. Filter for continuous filtration of a suspension under pressure, comprising:
a pressure vessel (1) for operation at atmospheric overpressure;
at least one filter element (2) constituted by a plurality of filter segments, rotatable on a filter shaft (4) in a filter cycle direction through a liquid suspension region and an air region within the pressure vessel (1) and subject to said overpressure, where each filter element (2) passes through one filter cycle for each rotation, first forming an accumulation of solids on the filter element when immersed in the suspension region and with filtrate drawn into the filter element, followed in the air region where filtrate and air pass through the accumulated solids and enter the filter element;
separate filtrate channels (4') in the shaft, where filtrate is collected from within the segments of the filter element and delivered to one end of the shaft;
a control head at said one end of the shaft, including a control disc (44) with a cake formation zone (114) operatively associated with some filtrate channels (4') and associated segments in the suspension region during the rotation and a dewatering zone (115) operatively associated with other filtrate channels (4') and associated segments and the air region during the rotation;
wherein the control disc further includes a snap blow zone (45) and said snap blow zone (45) is between the dewatering zone (115) and the cake formation zone (114), viewing in the direction of the filter cycle,
filtrate outlets (14, 215) for each zone, whereby for each segment of each rotating filter element, filtrate is discharged through the filtrate outlet for the cake formation zone and thereafter filtrate and air are discharged through the filtrate outlet for the dewatering zone, such that during rotation of each filter element a segment of the filter element containing primarily air is operatively disconnected from the dewatering zone and the cake formation zone;

wherein said control disc includes a distinct venting zone (46) after said snap blow zone (45), provided before a given filtrate channel (4') operatively associated with said segment portion reaches the cake formation zone (114),viewed in the direction of the filter cycle, with the venting zone (46) connected to a separation tank (25) via a separate pipe (46') to release said primarily air from the disconnected segment of the filter element (2) and operatively associated filtrate channel (4') to atmospheric pressure without the released air coming into contact with the cake formation zone.

6. Filter according to claim 5, wherein the filtrate outlets (14, 215) are connected to said separation tank (25) arranged at a lower elevation than the pressure vessel (1).

7. Filter according to claim 6, wherein the separation tank is connected to the filtrate outlets via barometric drop legs (114', 115') with a vertical length of 6 to 10 m.

8. Filter according to claim 5, wherein during the rotation of the shaft (4') through one cycle, a specific filtrate channel 4' first passes the cake formation zone (114), then the dewatering zone (115) and is followed by removal of the accumulated solids on the filter element by the passage of air through said snap blow zone (45), and just before the start of another cycle, said specific filtrate channel passes the venting zone (46), viewed in the direction of the filter cycle.

9. Filter according to claim 6, wherein
one outlet (215) is fluidly connected to the dewatering zone (115) of the control disc for collecting dewatering filtrate;
a second outlet (14") is fluidly connected to the cake formation zone (114) of the control disc for collecting cloudy cake filtrate;
a third outlet (14') is fluidly connected to the cake formation zone (114) of the control disc for collecting clear cake filtrate;
barometric drop legs (114', 115') fluidly connect the filtrate outlets (14', 14", 215) to a separation tank (25) arranged at a lower elevation than the pressure vessel (1).

* * * * *